United States Patent [19]

Montgomery

[11] Patent Number: 4,779,168
[45] Date of Patent: Oct. 18, 1988

[54] LAND VEHICLE REMOTELY CONTROLLED MOVABLE LIGHT SYSTEM

[76] Inventor: Jon Montgomery, P.O. Box 1598, Portola, Calif. 96122

[21] Appl. No.: 124,180

[22] Filed: Nov. 24, 1987

[51] Int. Cl.⁴ .......................... B60Q 1/06; F21V 3/18
[52] U.S. Cl. ...................................... 362/66; 362/233; 362/287; 307/10 LS; 340/825.72; 340/22
[58] Field of Search ........................ 362/66, 80, 82, 83, 362/61, 285, 286, 287, 233, 250; 307/10 LS; 340/825.72, 22, 696

[56] References Cited

U.S. PATENT DOCUMENTS

| | | | |
|---|---|---|---|
| 2,614,437 | 10/1952 | Meggitt | 362/68 X |
| 2,662,605 | 12/1953 | Riggs | 362/66 |
| 2,737,575 | 3/1956 | Ross | 362/66 |
| 2,901,595 | 8/1959 | Shosted | 362/68 |
| 4,353,110 | 10/1982 | Ellis | 362/66 X |
| 4,692,845 | 9/1987 | Widhaum et al. | 362/66 X |
| 4,707,014 | 11/1987 | Rich | 362/66 X |
| 4,712,167 | 12/1987 | Gordin et al. | 362/66 X |
| 4,722,030 | 1/1988 | Bowden | 362/233 X |

*Primary Examiner*—Allen M. Ostrager
*Assistant Examiner*—Richard R. Cole
*Attorney, Agent, or Firm*—H. Jay Spiegel

[57] ABSTRACT

Disclosed herein is a land vehicle remotely controlled movable light system. The system includes a plurality of lights which are mounted in various locations on the vehicle each of which includes an adjustment mechanism attached thereto enabling the adjustment of the rotative and annular position of the light. The adjustments are made via a controller mechanism which may be removably attached within the passenger compartment of the vehicle and including one controller device for each light. In the preferred embodiment, the controller mechanism may be attached within the passenger compartment of the vehicle and may operate the lighting devices through the use of electrical conductors wires within the vehicle. Alternatively, when it is desired to control the lights from outside the vehicle, the controller mechanism may be selectively removed from the passenger compartment and may be utilized to control each light through the use of wireless transmission from transmitters mounted in the controller mechanism to individual receivers mounted on each light control.

6 Claims, 1 Drawing Sheet

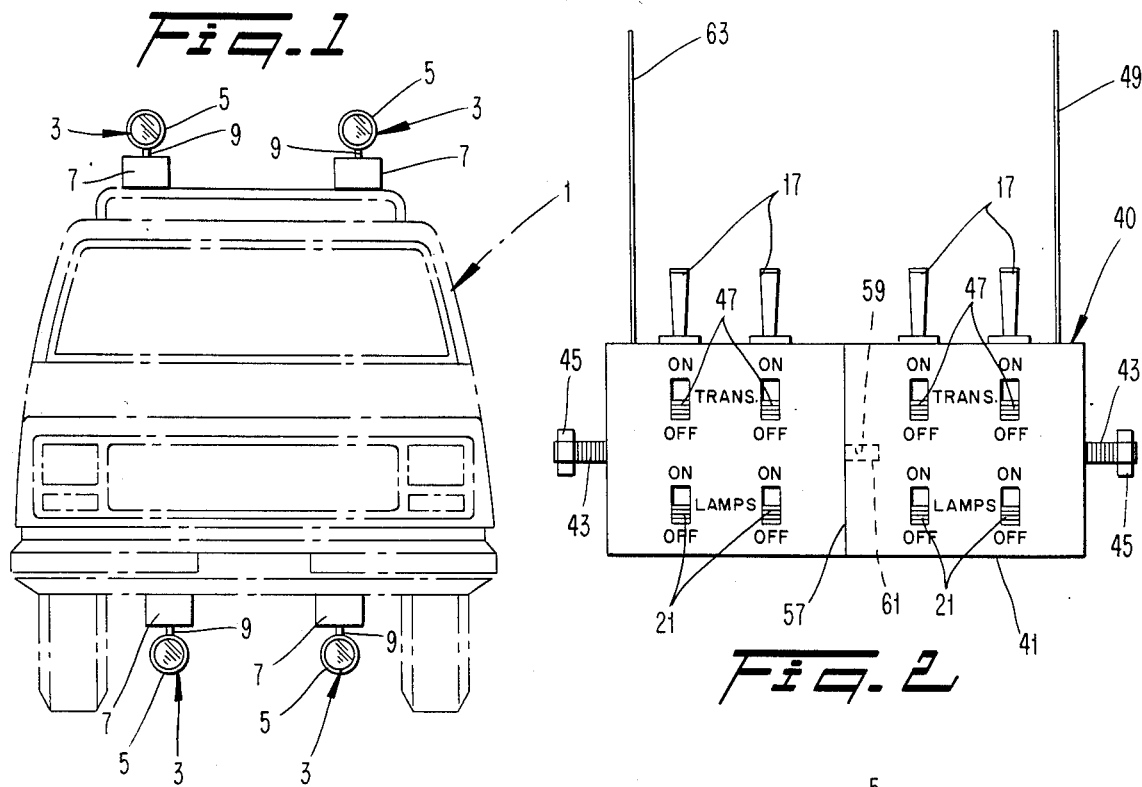
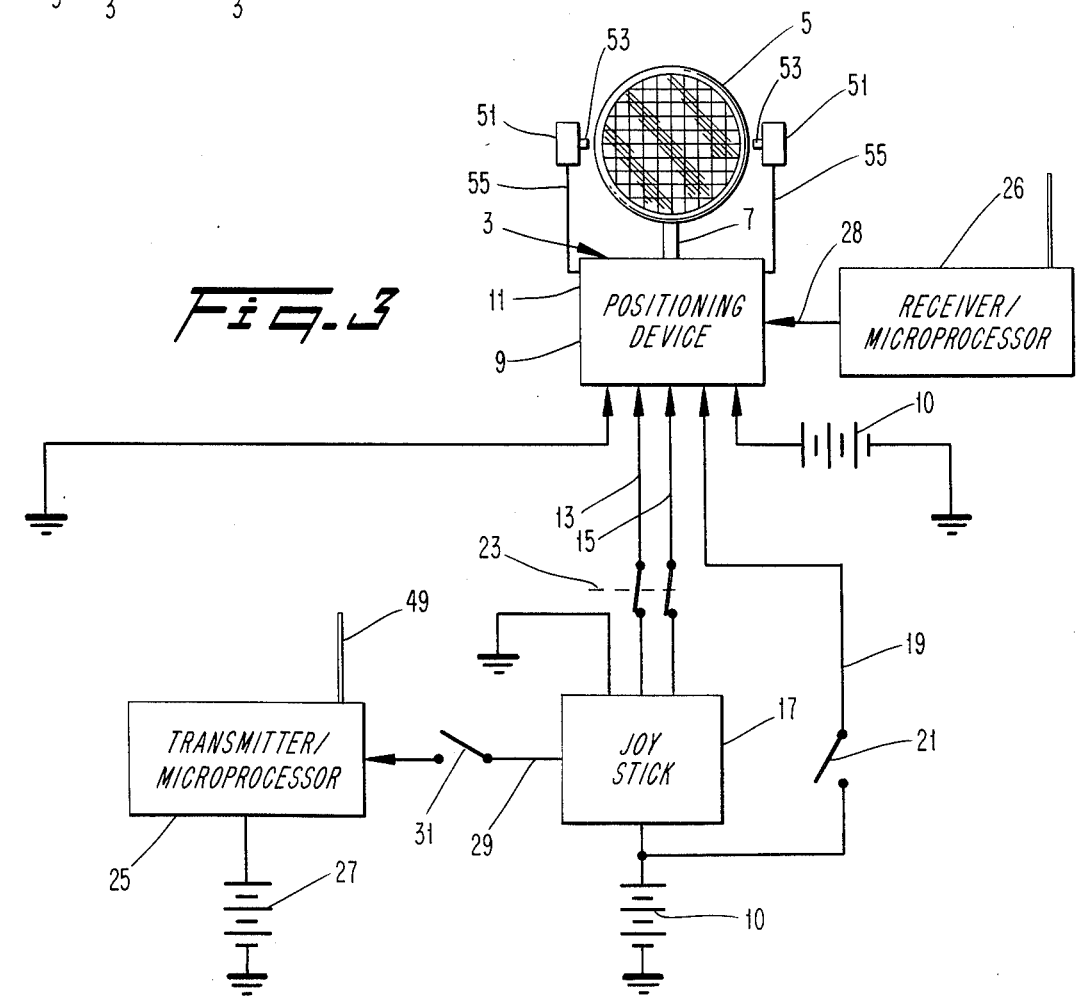

LAND VEHICLE REMOTELY CONTROLLED MOVABLE LIGHT SYSTEM

BACKGROUND OF THE INVENTION

In the prior art, remotely controlled lighting systems are known. For example, it is known to control an exterior light on a police vehicle from the interior of the car. Furthermore, many boats include remotely controlled spotlights.

Furthermore, the following U.S. Patents teach the concept of remotely activated vehicle lights: U.S. Pat. No. 2,614,437 to Meggitt, U.S. Pat. No. 2,662,605 to Riggs, U.S. Pat. No. 2,737,575 to Ross and U.S. Pat. No. 2,901,595 to Shosted. Shosted in particular teaches an exterior spotlight the position and direction of which may be controlled through the use of an interior handle.

However, none of these patents teaches the concept of a plurality of lights mounted in different places on a vehicle, each of which is individually controllable either through the use of hard wired electrical conductors or through the use of wireless communication as desired by the user.

SUMMARY OF THE INVENTION

The present invention overcomes the deficiencies found in the prior art as discussed hereinabove, and provides a new and improved light system wherein a plurality of lights may be mounted on a vehicle and may be individually controlled through the provision of both electrical conductors and wireless transmission either within the vehicle or outside the vehicle. The present invention includes the following interrelated aspects and features:

(a) In a first aspect, the present invention contemplates a plurality of lights each of which may be mounted in a different location on the vehicle. Examples of such locations are beneath the front bumper and above the roof although other areas may prove useful. For example, on a tow truck or wrecker, it might be advantageous to mount one or more lights in the rear portion of the vehicle so that the driver may view the area behind the vehicle to assist in towing another vehicle.

(b) A single controller mechanism is provided to control all of the lights and includes a control device for each light which is to be controlled. The control device may, if desired, comprise a joy stick. However, if desired, other equivalent structures may be utilized such as, for example, a ball rolling on a conductive surface or a flat switch which is pivotable in all directions to correspondingly control movements of the controlled light.

(c) In a further aspect, the controller mechanism, in the preferred embodiment, is designed to be electrically coupled to the lights via two alternative means. Firstly, the controller mechanism is interconnected with the lights through the use of hard wired electrical conductors. These electrical conductors are wired within the vehicle to the locations of the lights and the electrical conductors are electrically wired to adjustment means attached to each light and including electrical motors or other devices designed to adjust the light position.

(d) Additionally, the controller mechanism is provided with a transmitter for each control device and each adjustment means includes a receiver. Each transmitter transmits signals at a unique frequency with respect to the frequency of transmission of the other transmitters so that signals intended to adjust one light will not adjust any other lights on the vehicle. As should be understood, sufficient frequencies are available that there should be no danger that transmissions from one vehicle will activate the lights of another vehicle.

(e) In a further aspect, the controller mechanism includes a switch for each control device which controls whether signals from the control device will be transmitted to each adjustment means via electrical conductors or wireless transmission and reception. Through the use of the inventive controller mechanism, the controller mechanism may either be maintained within the passenger compartment of the vehicle with transmission and reception being had through the use of the electrical conductors or, alternatively, wireless transmission may be utilized with the controller mechanism being located either within the passenger compartment or detached from the dashboard and removed outside the vehicle where operation may be had through the use of portable batteries.

Accordingly, it is a first object of the present invention to provide a land vehicle remotely controlled movable light system.

It is a further object of the present invention to provide such a light system wherein the lights thereof may be controlled either through the use of electrical conductors or through wireless transmission and reception.

It is a still further object of the present invention to provide such an improved light system wherein control of the lights thereof may be had either within a vehicle or outside the vehicle.

These and other objects, aspects and features of the present invention will be better understood from the following detailed description of the preferred embodiments when read in conjunction with the appended drawing figures.

BRIEF DESCRIPTION OF THE DRAWINGS

FIG. 1 Shows a front view of a typical land vehicle with a plurality of lights in accordance with the present invention installed thereon.

FIG. 2 shows a front view of the controller mechanism of the present invention.

FIG. 3 shows a schematic representation of the electrical circuitry of the present invention.

SPECIFIC DESCRIPTION OF THE PREFERRED EMBODIMENT

With reference first to FIG. 1, a land vehicle 1 is depicted which has mounted thereon a plurality of adjustable lights 3. Each adjustable light 3 includes a lamp 5, an adjustment means 7 and a connection stem 9 interconnecting the adjustment means 7 and the lamp 5.

With reference to FIG. 3, one of the devices 3 along with the associated electronics is schematically depicted. As shown in FIG. 3, the adjustment means 9 may comprise a positioning device similar to that which is now used to adjust side mirrors on a vehicle and also to adjust a spotlight on a yacht. The positioning device includes an outer casing 11 which may be made of any durable weather-proof material such as, for example, aluminum alloys, plastic, iron sheeting and the like. Furthermore, the device 9 is specifically designed to be impervious to the various weather conditions which may be encountered by a land vehicle and, as well, is designed to resist the usual vibrations which accompany vehicle motion.

As seen in FIG. 3, the housing 11 has emanating therefrom several electrical conductors. The conductors 13, 15 send signals from a joy stick-type controller 17 to the positioning device 9 to control the movements thereof. Of course, as stated hereinabove, other devices may be utilized in place of the joy stick such as for example a conductive ball rolling on a conductive surface or a flat switch which may pivot in all directions. Further, servo limit switches 51 are provided each having an actuator 53 mounted in the path of movement of the light 5 to prevent the light from damaging adjacent vehicle structure. When the light 5 engages and moves the actuator 53, this fact is transmitted to the positioning device 9 via conductor 55 and the positioning device 9 than reverses the movement of the light 5 enough to disengage from the actuator 53. Each light 5 may have associated therewith as many switches 51 as are necessary depending upon mounting location. Furthermore, the conductor 19 extends from the vehicle battery 10 to the housing 11 and includes a switch 21. Operation of the switch 21 controls the illumination of the lamp 5. The switch 23 enables the user to connect and disconnect the electrical conductors 13, 15 between the joy stick 17 and the positioning device 9.

With further reference to FIG. 3, it is seen that connected to the joy stick 17 is a transmitter 25 which has its own portable battery 27 and which is selectively connected to the joy stick 17 by virtue of an electrical conductor 29 and a switch 31. As contemplated, the switches 23 and 31 are interconnected so that opening of the switch 23 will result in closing of the switch 31 and vice versa. The switch 21 operates independently of the switches 23, 31.

With reference to FIG. 2, a controller mechanism 40 is seen to include a housing 41 having a pair of threaded rods 43 extending outwardly therefrom and having removably attached thereto nuts 45. The rods 43 and nuts 45 are provided to enable the controller 40 to be detachably attached to a bracket (not shown) mounted within the passenger compartment of the land vehicle 1. Of course, the means of attachment of the mechanism 40 may be of any known type including a pair of projections (not shown) designed on the housing 41 to snap in and out of the mounting bracket.

As seen in FIG. 2, a number of switches are included on the housing 41. The switches 21 correspond to the switch 21 shown in FIG. 3. The switches 47 correspond to the switches 23, 31 of FIG. 3 with the on position of the switches 47 corresponding to closure of the switch 31 and corresponding opening of the switch 23, whereas, the off position of the switches 47 corresponds to the closed position of the switch 23 and the corresponding open position of the switch 31 as seen in FIG. 3. Also seen in FIG. 2 are a plurality of joy sticks 17 which are shown by way of example only. Finally, an antenna 49 which may be of the telescoping type is provided on the housing 41, which antenna 49 is connected to a plurality of transmitters corresponding to the transmitter 25 in FIG. 3 with there being contained within the housing 41 one transmitter 25 for each joy stick 17 and lamp 5. It should be understood that each such transmitter 25 transmits at a unique frequency different from the frequencies of the other transmitters so that each receiver associated with each positioning device 9 may receive signals from the appropriate transmitter. In this regard, with reference back to FIG. 3, the receiver 26 includes an integrally mounted microprocessor as does the transmitter 25. Thus, signals from the joy stick 17 travel from the conductor 29 to the micro processor section of the transmitter 25 where they are converted into signal which may be transmitted by the transmitter 25 to the receiver 26, with the microprocessor thereof converting the received signals into electrical impulses which travel through conductor 28 to the positioning device 9 where the positioning device 9 may operate to adjust the position of the lamp 9.

If desired, the housing 41 may divide into two halves at interface 57 with detachable connection being had through plug 59 and socket 61. In such case, each half of the housing 41 would have its own redundant circuitry including battery, transmitter, receiver, antenna (49,63) and conductor. With such a structure, two individuals could operate different lights on the vehicle from different locations.

Thus, it should be understood from FIGS. 2 and 3 that the present invention is designed to be utilized in a manner wherein the positioning device 9 is either controlled through the conductors 13 and 15 via the joy stick 17 or via wireless transmission from the transmitter/microprocessor 25 to the receiver/microprocessor 26. This is the case due to the alternate actuation of the switches 23, 31 as more clearly shown by the switches 47 in FIG. 2 wherein the off position of the switches 47 corresponds to control of the positioning device 9 via the conductors 13 and 15 and wherein control of the positioning devices 9 through wireless transmission between the transmitter/ microprocessor 25 and the receiver/microprocessor 26 corresponds to the on position of the switches 47.

As should be understood, each sub-system 3 includes conductors 13, 15 and 19 and, as such, on the back of the controller 40 a wiring harness is provided including a coupling designed to couple wires 13, 15 and 19 for each sub-system 3 to the appropriate switches and joy stick on the controller 40. Electrical coupling devices are well known in the prior art and the present invention includes a coupling device (not shown) having 12 pins and sockets with 3 pins being utilized for each sub-system 3. In this way, when it is desired to remove the controller 40 from the passenger compartment of the vehicle, a single electrical coupling mechanism is disconnected from the housing 41 whereupon the nuts 45 may be loosened and the device 40 may be easily removed from the vehicle.

As should be understood from the above explanation, the housing 41 has mounted therein a single transmitter/microprocessor 25 for each sub-system 3 with each such transmitter/microprocessor 25 transmitting at a unique frequency which is received by the corresponding receiver/microprocessor 26. The single antenna 49 shown in FIG. 2 is attached in parallel to each transmitter/microprocessor 25 so as to enable the broadcasting of the appropriate signals therefrom. The battery 27 shown in FIG. 3 is mounted within the housing 41. The receiver/microprocessors 26 do not need portable batteries since they are integrally connected into the electrical system of the vehicle and receive power from the battery 10 at all times.

Operation of the subject invention should be self-explanatory in light of the above disclosure. When it is desired to adjust the lamps 5 of one or more of the sub-systems 3, the joy stick 17 or equivalent structure is adjusted in a manner well known to those skilled in the art so that resulting movements of the lamp 5 via the connection means 7 are attained. If such control of the sub-systems 3 is desired within the passenger compartment of the vehicle 1, the switches 47 are turned to the off position which will result in control of the sub-systems 3 via the respective conductors 13, 15 and 19. When it is desired to control the sub-systems 3 by wireless transmission, the switches 47 are turned to the on position which, in FIG. 3, will result in opening of the switches 23 and closing of the switches 31. In this mode of operation, the device 40 may be left in the passenger compartment in mounted position or, if desired, may be removed from the passenger compartment and the sub-systems 3 may be operated from a remote location with the distance from the vehicle being limited only by the range of operation of the transmitter and receiver.

It should be understood that it is advantageous in many cases to be able to operate the sub-systems 3 from outside the vehicle 1. For example, when the vehicle 1 is a wrecker or tow truck, it is sometimes desirable to be able to remotely control lamps from outside the vehicle while another vehicle is being positioned for towing or other service such as repair late at night. Thus, due to the removable nature of the controller 40, the lights which may be conveniently mounted on the rear of the wrecker or tow truck may easily be controlled remotely in a convenient and expedient way.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed:

1. An improved lighting system for a vehicle comprising
   (a) at least one light mounted on a vehicle at a predetermined location, said at least one light being mounted on an adjustment device adapted to move said light in a plurality of directions and orientations; and
   (b) a controller mechanism detachably mountable within a passenger compartment of said vehicle, said mechanism including:
      (i) a control device movable to a variety of positions which result in movements of said adjustment device and, thereby, said light, and
      (ii) means electrically connecting said control device to said adjustment device and comprising an electrical conductor as well as a wireless transmitter-receiver; and
   (c) switch means mounted on said controller mechanism for switching between said electrical conductor and said wireless transmitter-receiver.

2. The invention of claim 1, wherein said wireless transmitter-receiver comprises a transmitter mounted on said controller mechanism and a receiver mounted on said adjustment device.

3. The invention of claim 1, wherein said at least one light comprises a plurality of lights mounted in different locations on said vehicle, each said light being mounted on a said adjustment device, said controller mechanism including an electrical conductor for each said light and a separate transmitter for each said light, each said adjustment device having a receiver mounted thereon.

4. The invention of claim 3, wherein each said transmitter transmits at a unique frequency and each receiver is tuned to only one of such unique frequencies.

5. The invention of claim 4, wherein said vehicle comprises a land vehicle.

6. The invention of claim 1, wherein said controller mechanism includes attachment means for detachably mounting said controller mechanism in said vehicle, said electrical conductor being connected to said controller mechanism when said controller mechanism is attached in said vehicle.

* * * * *